(12) United States Patent
Ichimura et al.

(10) Patent No.: US 7,129,431 B2
(45) Date of Patent: Oct. 31, 2006

(54) VEHICLE SWITCH ASSEMBLY

(75) Inventors: Takashi Ichimura, Fukui (JP); Takeo Nakamura, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/348,368

(22) Filed: Feb. 7, 2006

(65) Prior Publication Data

US 2006/0175183 A1 Aug. 10, 2006

(30) Foreign Application Priority Data

Feb. 8, 2005 (JP) ............................. 2005-031381

(51) Int. Cl.
*H01H 9/00* (2006.01)

(52) U.S. Cl. .................................................. 200/61.54

(58) Field of Classification Search ............. 200/61.27, 200/61.54–61.57; 280/728.1, 731; 307/10.1
See application file for complete search history.

(56) References Cited

U.S. PATENT DOCUMENTS 4,131,772 A * 12/1978 Weckenmann et al. .. 200/61.54
4,180,713 A * 12/1979 Gonzales .................. 200/61.27
4,352,401 A * 10/1982 Vitaloni .................... 200/61.27
4,518,836 A *  5/1985 Wooldridge .............. 200/61.54
6,538,220 B1 *  3/2003 Durocher ................. 200/61.54
6,548,772 B1 *  4/2003 Liburdi .................... 200/61.54

FOREIGN PATENT DOCUMENTS

JP        2003-118587 A      4/2003

* cited by examiner

*Primary Examiner*—Michael A. Friedhofer
(74) *Attorney, Agent, or Firm*—McDermott Will & Emery LLP

(57) ABSTRACT

An operative body is provided at one end of an arm attached behind a steering wheel. The arm protrudes from the outer periphery of the steering wheel. The operative body has a plurality of operative buttons. Such a structure enables various kinds of operation, and provides a vehicle switch assembly easily operable by extending a finger for manipulation only, while grasping the steering wheel with the hands.

2 Claims, 3 Drawing Sheets

VEHICLE SWITCH ASSEMBLY

BACKGROUND OF THE INVENTION

1. Field of the Invention

The present invention relates to a vehicle switch assembly that is attached near the steering wheel mainly of an automobile and used for operation of various kinds of functions.

2. Background Art

In recent advancement in functions of automobiles, an increasing number of automobiles have a vehicle switch assembly attached near the steering wheel for various kinds of operations of each function of the automobiles or various kinds of electronic equipment incorporated therein.

Such a conventional vehicle switch assembly is described with reference to FIG. 3.

FIG. 3 is a plan view of a steering wheel that has a conventional vehicle switch assembly attached thereto.

With reference to FIG. 3, a plurality of push switches 2 to be operated by pushing are received in pad 1A in the central part and spokes 1B in the left and right parts of steering wheel 1. Push switches 2 are provided on the front side of steering wheel 1, like operative buttons 2A and 2B. Behind steering wheel 1, lever switch 3 capable of horizontally and vertically being rocked is attached. Levers 3A and 3B project from the left and right sides of steering wheel 1, respectively.

Steering wheel 1 is fixed onto a steering shaft (not shown) extending from the body of the vehicle. The plurality of push switches 2 and lever switch 3 are electrically coupled to an electronic circuit of the vehicle via leads (not shown), or other means.

In the above structure, when operative button 2A is pushed while the vehicle is running, push switch 2 of the button is electrically turned on or off. The electric signals generated by this operation are transmitted to the electronic circuit of the vehicle, and the speed change gear of the automatic transmission, for example, is shifted up or down.

When predetermined operative button 2B is pressed, push switch 2 of the button is electrically turned on, and a radio or air conditioner, for example, is operated to change the sound volume or airflow thereof.

When lever 3A or 3B is rocked, lever switch 3 is electrically turned on or off. This operation flashes the turn signal lamps, turns on the head lights, or works the wipers.

In short, operating a plurality of operative buttons 2A and 2B on the front side of steering wheel 1, or lever 3A or 3B of lever switch 3 provided behind the steering wheel works each part of the automobile, such as a gear and light, and various kinds of electronic equipment, such as a radio and air conditioner.

As information on the prior art references related to the present invention, Japanese Patent Unexamined Publication No. 2003-118587, for example, is known.

However, in the above conventional vehicle switch assembly, only a limited number of switches and operative buttons can be placed in the limited space, such as pad 1A and spoke 1B of steering wheel 1, while automobiles tend to have more advanced functions and more operative functions. Providing switches on an instrument panel including instruments, such as a speed meter, poses a problem of operational difficulty. Because the switches are far from the steering wheel, a driver has to operate them by completely leaving his/her hand from the steering wheel, and he/she has to extend his/her hand, while checking the position of the operative button.

SUMMARY OF THE INVENTION

The present invention aims to address such a conventional problem, and provides a vehicle switch assembly with which various kinds of operations can be performed easily near the steering wheel.

To address the above problem, the present invention includes, an arm attached behind a steering wheel, and an operative body provided at one end of the arm. The arm projects from the outer periphery of the steering wheel. The operative body constitutes a vehicle switch assembly having a plurality of operative buttons.

Such a structure allows a driver to perform various kinds of additional operations, and can provide a vehicle switch assembly easily operable by extending a finger for manipulation only while holding the steering wheel with his/her hands.

DETAILED DESCRIPTION OF THE INVENTION

An exemplary embodiment of the present invention is described hereinafter with reference to FIGS. 1, 2A, and 2B. Elements having the structures similar to those of the elements described in "Background Art" are denoted with the same reference marks and detailed descriptions thereof are omitted.

Exemplary Embodiment

Figure 1:
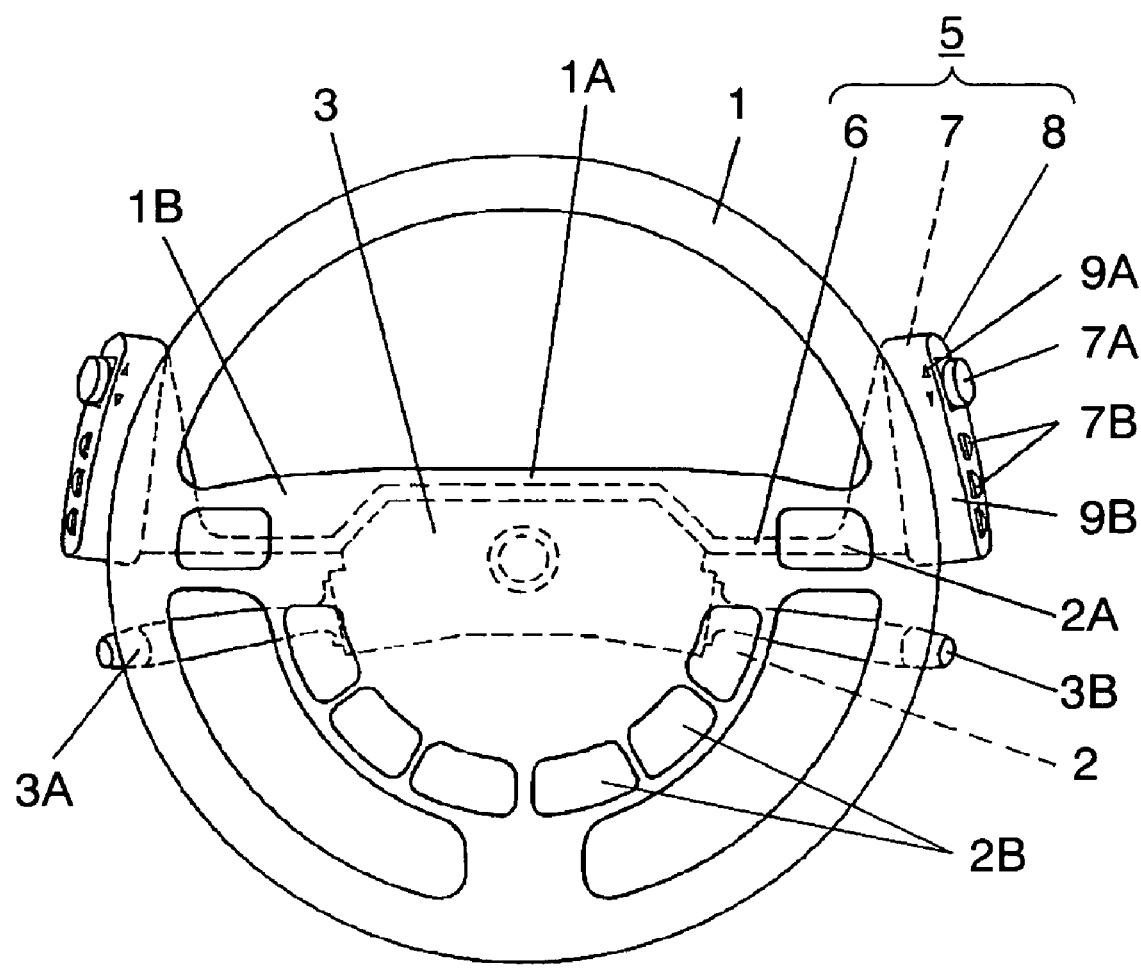
FIG. 1 is a plan view of a steering wheel having vehicle switch assemblies in accordance with an exemplary embodiment of the present invention attached thereto.

FIG. 1 is a plan view of a steering wheel having vehicle switch assemblies of the present invention attached thereto. With reference to FIG. 1, a plurality of push switches 2 to be operated by pushing is received in pad 1A in the central part and spoke 1B in the left or right part of steering wheel 1. Push switches 2 are provided on the front side of steering wheel 1, like operative buttons 2A and 2B. Behind steering wheel 1, lever switch 3 capable of horizontally and vertically being rocked is attached. Levers 3A and 3B project from the left and right sides of steering wheel 1, respectively.

For vehicle switch assembly 5 of the present invention, one end of arm 6 made of an insulating resin is attached to a steering column behind steering wheel 1. On the other end of arm 6, operative body 8 for receiving a plurality of switches 7 is placed to slightly protrude from the outer periphery of steering wheel 1.

Operative buttons 7A and 7B of switch 7 are placed on the side face of operative body 8 in the outer peripheral direction of steering wheel 1. Further on the front side of operative body 8, which is in the front side direction of steering wheel 1, identifications 9A and 9B for showing the functions of operative buttons 7A and 7B are formed by printing or other methods.

This operative body 8 is placed in an area 1 to 15 cm, preferably 2 to 10 cm spaced from the rear side of steering wheel 1.

Steering wheel 1 having vehicle switch assemblies 5 attached on the left and right sides thereof are fixed onto a steering shaft (not shown) extending from the vehicle body. A plurality of push switches 2, lever switch 3, and vehicle switch assemblies 5 are electrically coupled to the electronic circuit of the vehicle via leads (not shown) or other means.

In the above structure, when operative button 2A is pushed while the vehicle is running, push switch 2 of the button is electrically turned on or off. The electric signals generated by this operation are transmitted to the electronic circuit of the vehicle, and the speed change gear of the automatic transmission, for example, is shifted up or down.

When predetermined operative button 2B is pressed, push switch 2 of the button is electrically turned on or off, and a radio or air conditioner, for example, is operated to change the sound volume or airflow thereof. When lever 3A or 3B is rocked, lever switch 3 is electrically turned on or off. This operation flashes the turn signal lamps, turns on the head lights, or works the wipers.

Further, when operative button 7A of vehicle switch assembly 5 is vertically rocked, a plurality of switches 7 are electrically turned on or off to switch the temperature of the air conditioner, for example. When operative button 7B is pushed, the telephone or audio system is turned on or off, or recording thereof is performed, for example.

Figure 2A:
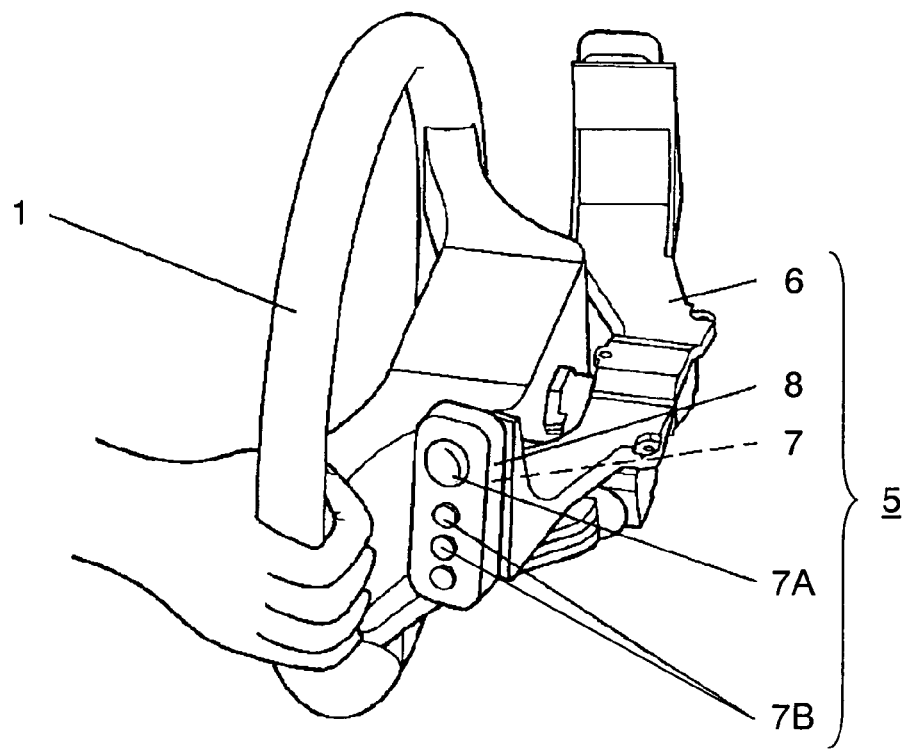
FIG. 2A is a perspective view of the steering wheel having vehicle switch assemblies in accordance with the exemplary embodiment of the present invention attached thereto.

FIG. 2A is a perspective view of a steering wheel having vehicle switch assemblies in accordance with an exemplary embodiment of the present invention attached thereto. As shown in FIG. 2A, in vehicle switch assembly 5, operative body 8 including a plurality of switches 7 is placed in an area spaced from the rear side of steering wheel 1 with a predetermined clearance provided therebetween. This structure prevents the hands grasping steering wheel 1 from hitting operative bodies 8 and inhibiting the steering of steering wheel 1.

Figure 2B:
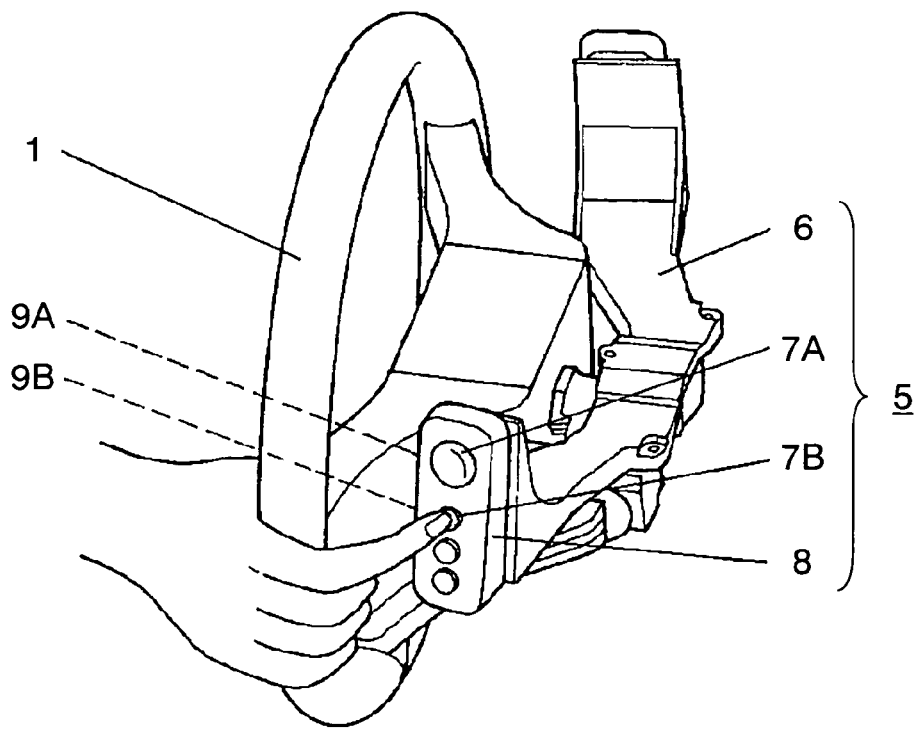
FIG. 2B is another perspective view of a steering wheel having vehicle switch assemblies in accordance with an exemplary embodiment of the present invention attached thereto.
Figure 3:
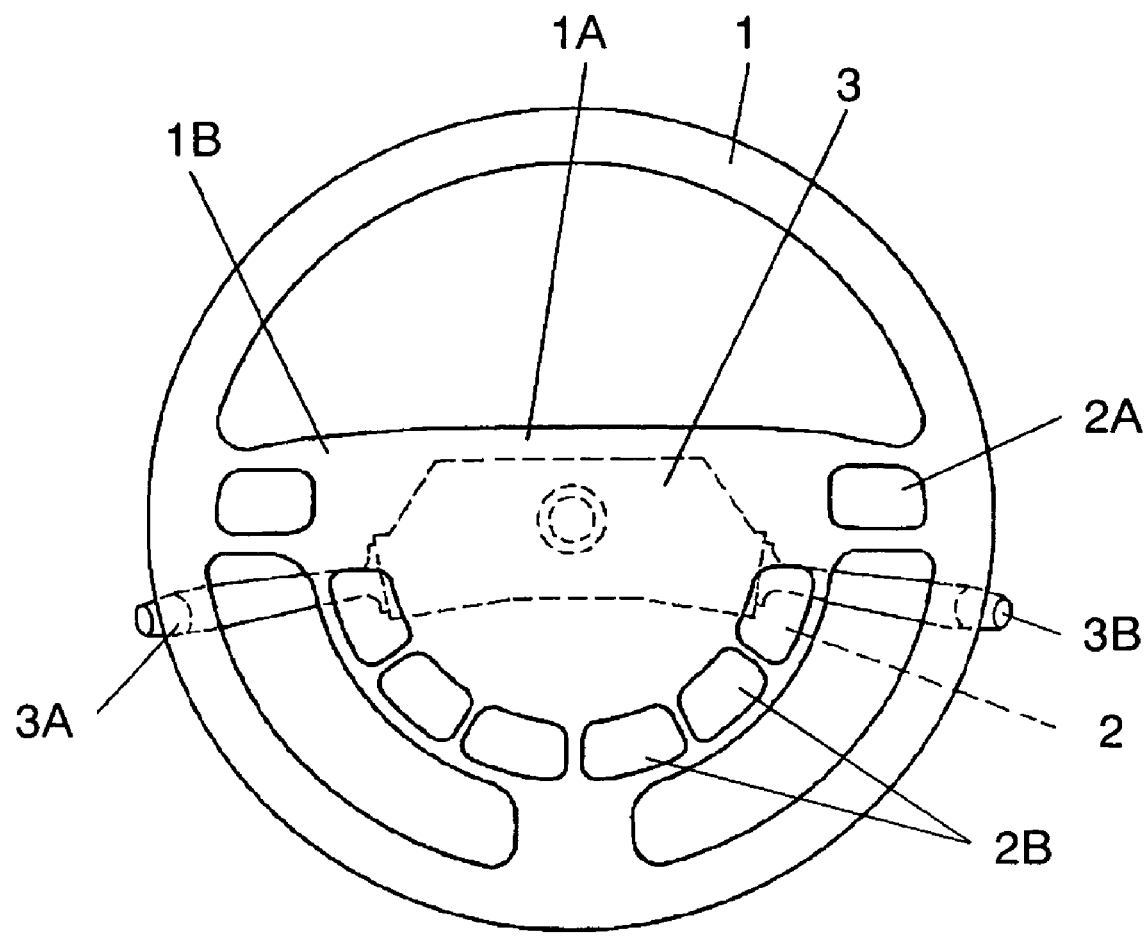
FIG. 3 is a plan view of a steering wheel having a conventional vehicle switch assembly attached thereto.

FIG. 2B is another perspective view of a steering wheel having vehicle switch assemblies in accordance with an exemplary embodiment of the present invention attached thereto. As shown in FIG. 2B, operative body 8 is formed to slightly protrude from the outer periphery of steering wheel 1. Further, operative buttons 7A and 7B are placed on the side face of operative body 8 in the outer peripheral direction of steering wheel 1. Therefore, when manipulating operative buttons 7A and 7B, a driver can easily manipulate them by extending a finger for manipulation only without leaving his/her hand from steering wheel 1.

Formed on the front side of operative body 8, in the front side direction of steering wheel 1 are identifications 9A and 9B, i.e. "ON", "REC", and "TEL", showing the functions of operative buttons 7A and 7B. This structure allows a driver to easily identify an operative button to be manipulated with his/her eyes, with his/her face toward the front side, the driving direction.

In vehicle switch assembly 5, one end of arm 6 is attached behind steering wheel 1 and integrated therewith. One rotation of steering wheel 1 rotates vehicle switch assembly 5 together. The physical relation between steering wheel 1 and operative body 8 is always the same. Therefore, even with steering wheel 1 being rotated, operative buttons 7A and 7B can easily be manipulated by extending a finger for manipulation only.

The clearance between operative body 8 and the rear side of steering wheel 1 is 1 to 15 cm, preferably 2 to 10 cm. This is because the necessary clearance is such that only a finger can be extended for manipulation while the hands are grasping steering wheel 1 without hitting operative bodies 8.

As described above, in accordance with the exemplary embodiment, operative body 8 including a plurality of operative buttons 7A and 7B is provided at one end of arm 6 that is attached behind steering wheel 1, and operative body 8 protrudes from the outer periphery of steering wheel 1. Such a structure enables various kinds of additional operations and can provide a vehicle switch assembly 5 easily operable by extending a finger for manipulation only while grasping steering wheel 1.

In the above description, vehicle switch assemblies 5 are attached on the left and right sides of steering wheel 1. Depending on the number of operations or functions to be added, the switch assembly can be provided on one side only. The present invention can be implemented in various kinds of operation forms of operative buttons 7A and 7B in operative body 8, such as rotation and tilting, other than rocking and pushing as described above.

The vehicle switch assembly of the present invention can easily provide various kinds of operation and is useful for operation of various kinds of functions mainly of an automobile.

What is claimed is:

1. A vehicle switch assembly comprising:
   an arm attached behind a steering wheel and protruding from an outer periphery of the steering wheel; and
   an operative body provided at one end of the arm and including a plurality of operative buttons;
   wherein the vehicle switch assembly rotates together with the steering wheel.

2. The vehicle switch assembly of claim 1, wherein the operative body is placed in an area in which a clearance between an rear side of the steering and the operative body range 1 to 15 cm.

* * * * *